United States Patent [19]
Tago

[11] Patent Number: 6,025,598
[45] Date of Patent: Feb. 15, 2000

[54] RADIATION PHOTOGRAPHIC APPARATUS

[75] Inventor: Akira Tago, Tokyo, Japan

[73] Assignee: Canon Kabushiki Kaisha, Tokyo, Japan

[21] Appl. No.: 08/989,029

[22] Filed: Dec. 11, 1997

[30] Foreign Application Priority Data

Dec. 13, 1996 [JP] Japan ..................... 8-352632

[51] Int. Cl.⁷ .................................................. G01T 1/24
[52] U.S. Cl. .................. 250/370.01; 250/370.08; 250/370.09; 438/64
[58] Field of Search ............... 250/370.01, 370.08, 250/370.09; 438/64

[56] References Cited

U.S. PATENT DOCUMENTS

| 5,276,329 | 1/1994 | Hughes | 250/370.09 |
| 5,661,309 | 8/1997 | Jeromin et al. | 250/580 |
| 5,804,832 | 9/1998 | Crowell et al. | 250/370.09 |

*Primary Examiner*—Constantine Hannaher
*Assistant Examiner*—Andrew Israel
*Attorney, Agent, or Firm*—Fitzpatrick, Cella, Harper & Scinto

[57] ABSTRACT

A glass substrate holding apparatus for holding a glass substrate formed with a semiconductor thin film element has a first elastic member disposed on the substantially outer peripheral portion of a surface opposite to that surface of the glass substrate on which the semiconductor thin film element is formed, a mounting member disposed so as to hold the first elastic member between itself and the glass substrate, and a second elastic member disposed in a space surrounded by the glass substrate, the first elastic member and the mounting member, and interposed between the glass substrate and the mounting member.

13 Claims, 2 Drawing Sheets

RADIATION PHOTOGRAPHIC APPARATUS

BACKGROUND OF THE INVENTION

1. Field of the Invention

This invention relates to holding means for a glass substrate formed with a semiconductor thin film element and a radiation photographing apparatus for applying radiation to an object to thereby obtain the radiation image of the object.

2. Related Background Art

Apparatus for applying radiation to an object and detecting the intensity distribution of the radiation transmitted through the object to thereby obtain the radiation image of the object have heretofore been widely utilized in the fields of industrial non-destruction inspection and medical treatment and diagnosis. The radiation image of such an object is photographed by a combination of a fluorescent plate emitting fluorescence by radiation or an intensifying screen and silver salt film. That is, radiation is applied through the object, and the radiation is converted into visible light by the fluorescent plate and a latent image is formed on the silver salt film, whereafter this silver salt film is chemically treated and a radiation image is photographed as an analog photograph.

On the other hand, by the advance of digital technology in recent years, a radiation image is converted into an electrical signal, and this electrical signal is image-processed, and thereafter is reproduced as a visible image in a CRT or the like to thereby obtain a radiation image of high quality. As an apparatus for converting this radiation image into an electrical signal, there is, for example, a film digitizer for photographing by a combination of a fluorescent plate and silver salt film, and applying light to a radiation image recorded on radiation photographic film obtained, photo-electrically reading the light transmitted through the radiation photographic film by a CCD or the like, and converting it into an electrical signal.

Also, owing to the advance of the semiconductor process technology in recent years, it has become possible to make a solid photodetector in which amorphous semiconductor film is sandwiched by and between glass substrates and solid photodetector elements by semiconductor thin film comprising transparent electrically conductive film and electrically conductive film are arranged in the form of a matrix, and there has been proposed radiation detecting means in which this solid photodetector and a scintillator for converting radiation into visible light are layered.

By radiation transmitted through an object being applied to this radiation detecting means, the radiation is converted into visible light by the scintillator, and this visible light is detected as an electrical signal by the photoelectric converting portion of the solid photodetector elements. This electrical signal is read out from each solid photodetector element by a predetermined reading-out system, and is A/D-converted, whereby a radiation image signal is obtained. This signal is subjected to various signal processings by an image signal processing apparatus, whereafter it is reproduced as a radiation image by reproducing means such as a CRT, and is utilized for image reading diagnosis.

Chest photographing directed to the diagnosis of chest diseases is nowadays effected by the use of a screen film system comprising a combination of an intensifying screen and film, but since chest photographing requires a film of a large area, use is generally made of large film of 14 inches×14 inches or 14 inches×17 inches. Accordingly, when chest photographing is to be effected by the use of radiation detecting means comprising a combination of a scintillator and solid photodetector elements, it is necessary to form a solid photodetector element on a glass substrate of a large area such as 14 inches×14 inches, 14 inches×17 inches or greater by the photolithography method, and make radiation detecting means.

However, generally, quartz glass having a thickness of 1.1 mm is used as the glass substrate, and quartz glass having a smaller thickness of 0.7 mm is sometimes used for lighter weight, and in order that by the use of radiation detecting means in which amorphous semiconductor film is sandwiched between such fragile thin glass substrates of a large area of 14 inches×17 inches or greater and solid detection elements comprising transparent electrically conductive film and electrically conductive film are arranged in the form of a matrix, a radiation photographing apparatus may be embodied and used in the field of medical treatment, a packaging form sufficiently taking environmental resistance into account, particularly, holding means for reliably holding the fragile glass substrate with shock resistance and vibration resistance taken into account becomes necessary.

Particularly, when with a radiation photographing apparatus carried on a vehicle, medical examination is to be effected at various locations, more excellent shock resisting and vibration resisting characteristics are required in order to satisfy the performance as radiation image detecting means even if the apparatus undergoes the vibrations during the movement of the vehicle, and particularly the vibrations and shocks on bad roads.

In the conventional art, however, there is no specific proposition of holding means or the like excellent in shock resistance and vibration resistance and moreover, glass is extremely small in coefficient of thermal expansion as compared with metals and therefore, the influence of thermal deformation need be sufficiently taken into consideration. That is, if the glass substrate is fixed to a metallic mounting substrate, stress will be applied to the glass substrate due to changes in the environmental temperature because glass and the mounting substrate extremely differ in coefficient of thermal expansion from each other, and in the worst case, there will arise the problem that the destruction of the glass substrate will result.

SUMMARY OF THE INVENTION

It is an object of the present invention to solve the above-noted problem and to provide glass substrate holding means having high vibration resistance, high shock resistance and a high temperature resisting characteristic and yet capable of reliably holding a thin glass substrate of a large area, and a radiation photographing apparatus.

Other objects of the present invention will become apparent from the following detailed description of some embodiments of the invention.

DESCRIPTION OF THE PREFERRED EMBODIMENTS

Figure 1:
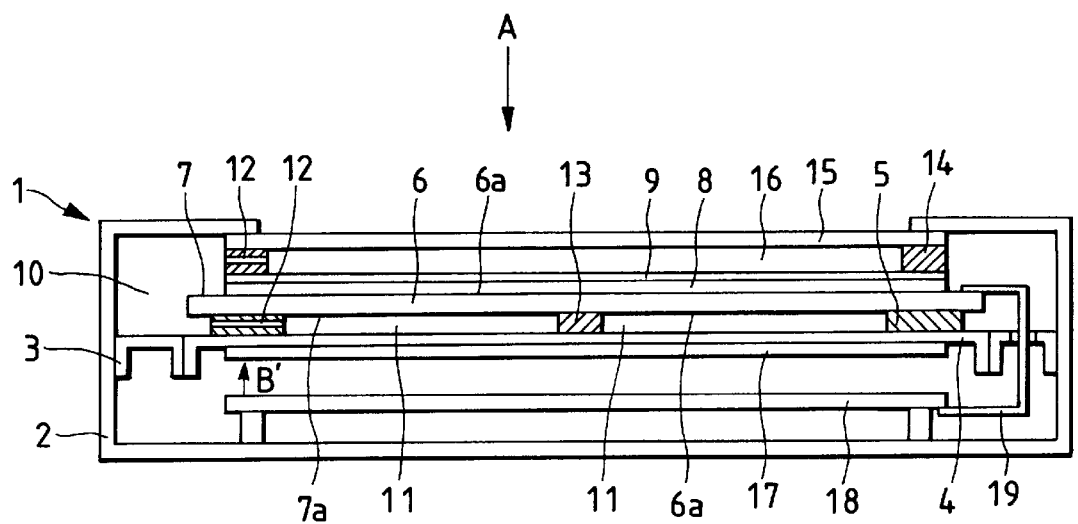
FIG. 1 is a cross-sectional view of an embodiment of the present invention.

The invention will hereinafter be described in detail with respect to an embodiment thereof shown in the drawings.

Referring to FIG. 1 which is a cross-sectional view of a radiation photographing apparatus according to an embodiment of the present invention, the radiation photographing apparatus 1 has its interior shielded from light by a cover member 2, and a plate-like mounting member 4 is fixed to the central portion of the interior of the cover member 2 through a surrounding mounting means 3. A first elastic member 5 is attached onto the mounting member 4 by pasting or an adhesive agent, etc., and a glass substrate 6 is likewise fixed onto the first elastic member 5 as by pasting or an adhesive agent. A semiconductor thin film element 7 is two-dimensionally formed on the upper surface 6a of the glass substrate 6 as by the photolithography method or the like. A scintillator 8 for converting a radiation image into visible light is brought into close contact with the semiconductor thin film element 7 by means such as adhesive securing, and the scintillator 8 is formed by growing a cesium iodide compound such as CsI : Na or CsI : Tl into columnar crystal on an aluminum substrate 9 as by evaporation, or applying a rare earth fluorescent material onto a substrate such as polyethylene terephthalate (PET) or paper.

The glass substrate 6, the semiconductor thin film element 7, the scintillator 8 and the aluminum substrate 9 together constitute radiation image detecting means 10. The radiation image detecting means 10 may be a semiconductor thin film two-dimensional sensor formed of amorphous selenium, precharged with charges and detecting a charge distribution varied by the incidence of radiation, e.g. X rays.

Figure 2:
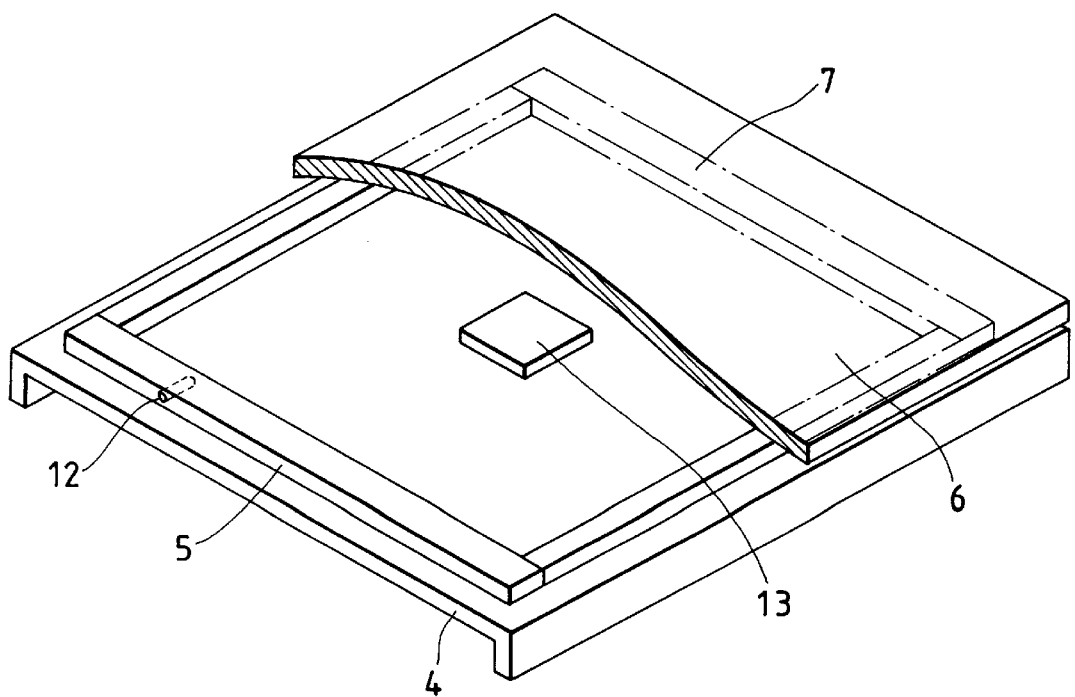
FIG. 2 is a perspective view of an elastic member.

Referring now to FIG. 2 which is a perspective view of the first elastic member 5, this first elastic member 5 comprises four bar-like members arranged into a square shape, and the joint portions of adjacent ones of these members are joined together without any gap, and a first substantially hermetically sealed space 11 is formed by the mounting member 4, the first elastic member 5 and the glass substrate 6.

Figure 3:
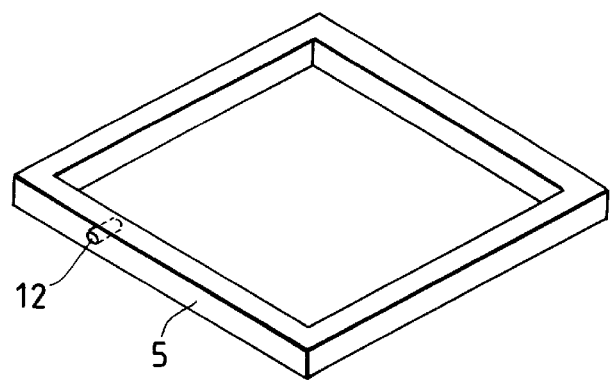
FIG. 3 is a perspective view of a modification of the elastic member.

Also, the first elastic member 5 is formed with a minute orifice 12, through which the air in the first substantially hermetically sealed space 11 communicates with the atmosphere. The minute orifice 12 may be formed so as to extend through the first elastic member 5, as shown in FIG. 2, or a slight gap may be formed in the joint portion between adjacent ones of the bar-like first elastic members. While the first elastic member 5 comprises four bar-like members arranged into a square shape without any gap, it may be a single seamless member formed into a square shape, as shown in FIG. 3.

Also, the material of the first elastic member 5 may preferably be a material of low density which creates little scattered ray by the application of radiation thereto, and may more preferably be silicon gel, silicon rubber, neosponge, polyurethane, maltplene or the like. By thus using a material which creates low scattered rays as the material of the first elastic member 5, the influence of rearward scattered rays again entering the scintillator 8, of the scattered rays created from the first elastic member 5 by the radiation transmitted through the radiation image detecting means 10 can be reduced.

Figure 4:
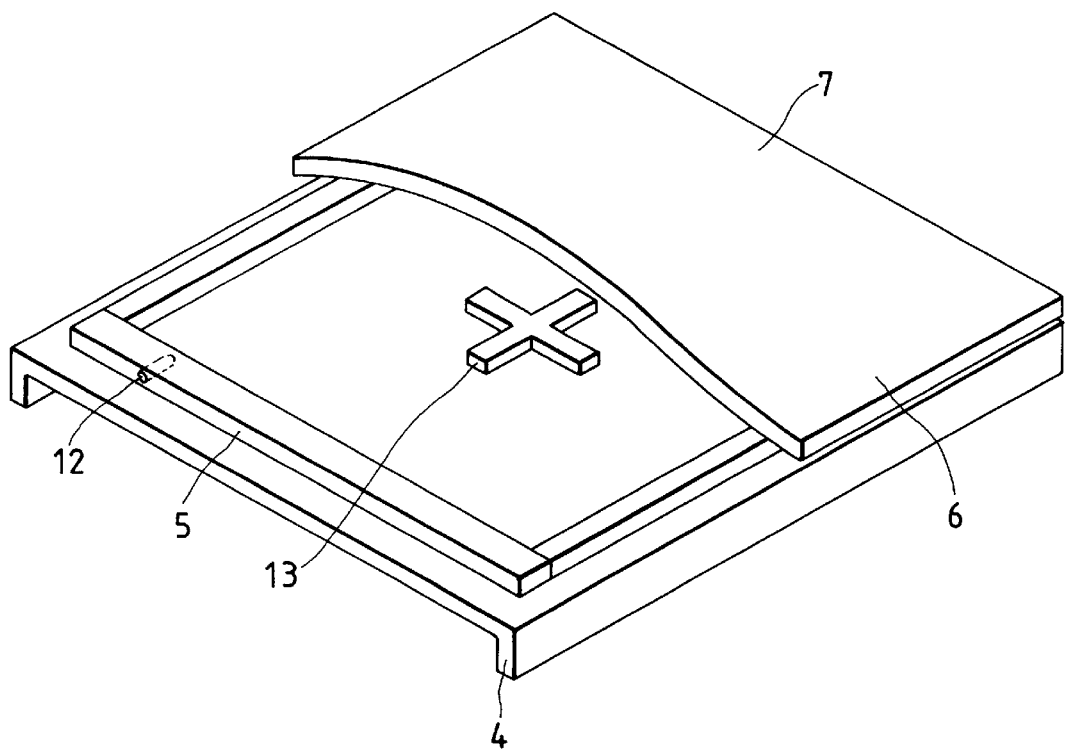
FIG. 4 is a perspective view of another modification of the elastic member.

A second elastic member 13 formed of a material similar to that of the first elastic member 5 is disposed on the substantially central portion of the inner side of the first elastic member 5, and one surface of the second elastic member 13 is stuck on the mounting member 4 and the other surface is stuck on the glass substrate 6 and fixed as by an adhesive. While the second elastic member 13 is of a block-like shape as shown in FIG. 2, it may be a cruciform as shown in FIG. 4, or may be of a square shape like the first elastic member 5 shown in FIG. 3 and smaller than the first elastic member 5. In this latter case, the second elastic member 13 may preferably be formed with a minute orifice 12 like the first elastic member 5.

As required, a third elastic member 14 formed of a material similar to that of the first elastic member 5 is fixed at a location substantially corresponding to the first elastic member 5 with the radiation image detecting means 10 interposed therebetween on the substantially peripheral portion of the scintillator 8 and the aluminum substrate 9, as by pasting or an adhesive agent, and a front face member 15 formed of carbon fiber reinforced resin (CFRP) excellent in radiation transmitting property and having mechanical strength is disposed on the third elastic member 14. A second substantially hermetically sealed space 16 is formed by the aluminum substrate 9, the third elastic member 14 and the front face member 15.

Also, a leaden plate 17 is disposed under the mounting member 4, and an electronic circuit 18 is provided with its legs standing on the bottom of the cover member 2 below the leaden plate 17, and the radiation image detecting means 10 and the electronic circuit 18 are connected together through a tab 19. The leaden plate 17 is positioned between the radiation image detecting means 10 and the electronic circuit 18 and prevents the influence of the radiation upon the electronic circuit 18.

The third elastic member 14, like the first elastic member 5, is disposed so that the four elastic members thereof may surround the substantially peripheral portion of the aluminum substrate 9 of the scintillator 8 of the radiation image detecting means 10 with the joint portions thereof joined together without any gap, and any stress normally created in the joint portion between the semiconductor thin film element 7 on the glass substrate 6 and the tab 19 by the tab 19 which joins the glass substrate 6 and the end portion of the electronic circuit 18 together may be alleviated by the third elastic member 14. Further, the third elastic member 14 is disposed at a location substantially corresponding to the first elastic member 5 on the aluminum substrate 9 of the scintillator 8 and the radiation image detecting means 10 is disposed so as to be sandwiched by and between the first elastic member 5 and the third elastic member 14, whereby the radiation image detecting means may be held without any shearing force acting on the radiation image detecting means 10 while stability and high reliability are maintained.

With the above-described construction, when an object to be examined is to be photographed by the radiation photographing apparatus 1 holding the radiation image detecting means 10 therein, the photographed region of the object to be examined is disposed so as to come into contact with the front face member 15, and radiation is applied from a radiation generating source, not shown, to the object to be examined. The radiation transmitted through the object to be examined is transmitted through the front face member 15 and is further transmitted through the aluminum substrate 9 and enters the scintillator 8. The radiation is converted into visible light by the scintillator 8 and is detected as an electrical signal by a photodetector element comprising semiconductor thin film two-dimensionally arranged on the glass substrate 6. The detected electrical signal is directed to the electronic circuit 18 through the tab 19 and is A/D-converted into a digital signal, and this digital signal is sent to a controller, not shown, through a cable and a connector, not shown, and is further displayed on a CRT monitor and is printed on film by a printer for medical treatment.

The mounting member 4 and the cover member 2 are designed to vertically compress the first elastic member 5, the second elastic member 13 and the third elastic member 14 as viewed in FIG. 1 and sandwich them therebetween and therefore, by this compressive force, the first elastic member 5, the second elastic member 13 and the third elastic member 14 are deformed, whereby their thicknesses become smaller.

Paying attention to the first elastic member 5 and the second elastic member 13 at this time, the radiation image detecting means 10 plays the role of a beam and flexes and therefore, a force applied per unit area of the first elastic member 5 and a force applied per unit area of the second elastic member 13 differ from each other and as the result, the amounts of deformation thereof in the direction of thickness thereof differ from each other, and the glass substrate 6 is slightly deformed.

In order to solve this problem, it becomes possible to change the thickness or area or hardness of the second elastic member 13 as compared with the first elastic member 5 to thereby maintain the flatness of the radiation image detecting means 10. That is, an elastic member smaller in thickness and higher in hardness relative to the first elastic member 5 is used as the second elastic member 13, whereby the prevention of the deformation thereof and improved vibration resistance can be achieved.

When the environmental temperature changes, the mounting member 4 and the glass substrate 6 expand or contract in their lengthwise directions, and their coefficients of thermal expansion differ from each other and therefore, a difference occurs to the amounts of change thereof, but the first elastic member 5 and the third elastic member 14 are deformed to thereby absorb the difference between the amounts of change of the mounting member 4 and the glass substrate 6 and therefore, no stress is applied to the glass substrate 6 and it never happens that the glass substrate 6 is damaged by changes in the environmental temperature or unnecessary stress is applied to the semiconductor thin film element formed on the glass substrate 6.

Also, the object to be examined comes into direct contact with the front face member 15 and therefore, when the shock by the object to be examined is applied to the front face member 15, the second substantially hermetically sealed space 16 formed by the aluminum substrate 9 of the scintillator 8, the third elastic member 14 and the front face member 15 is present on the radiation incidence surface side of the radiation image detecting means 10, as shown in FIG. 1, and as required, the first substantially hermetically sealed space 11 formed by the mounting member 4, the first elastic member 5 and the glass substrate 6 is present on the opposite side of the second substantially hermetically sealed space 16 with respect to the radiation image detecting means 10 and therefore, even if a shock is applied to the front face member 15 by the object to be examined, the first substantially hermetically sealed space 11 and the second substantially hermetically sealed space 16 play the role of a damper, and the shock applied to the radiation image detecting means 10 is absorbed and localized shock power is dispersed.

When there is a change in the atmospheric pressure in the environment wherein the radiation photographing apparatus 1 is disposed, the air pressure in the first substantially hermetically sealed space 11 and in the second substantially hermetically sealed space 16 always becomes equal to the atmospheric pressure because the first elastic member 5 forming the first substantially hermetically sealed space 11 and the third elastic member 14 forming the second substantially hermetically sealed space 16 are each formed with the minute orifice 12, and accordingly, it never happens that any external stress by the change in the atmospheric pressure in the environment occurs to the radiation image detecting means 10.

When vibrations are applied to the radiation image detecting means 10, if vertical vibrations are applied to the surface of a flat portion holding the cover member 2 surrounding it, acceleration as great as ten or more times that in the peripheral portion will be applied to the center of the flat portion and as the result, the amount of deformation of the central portion of the large area of 14 inches×17 inches will exceed several millimeters. Accordingly, if this amount of deformation exceeds the thickness of the first elastic member 5 or the thickness of the third elastic member 14, the central portion of the glass substrate 6 will collide with the mounting member 4 or the front face member 15, whereby the glass substrate 6 will be damaged. Also, when the amount of deformation of the central portion is great, the columnar structure of CsI which is a fluorescent material may be destroyed.

However, since the second elastic member 13 is attached to the substantially central portion of the glass substrate 6 as by an adhesive, the glass substrate 6 can be reliably held and at the same time, the deformation of the central portion of the glass substrate 6 can be made substantially equal to that of the peripheral portion thereof, and the amount of deformation of the radiation image detecting means 10 can be minimized.

Also, the first elastic member 5, the second elastic member 13 and the first substantially hermetically sealed space 11 and further, the third elastic member 14 and the second substantially hermetically sealed space 16, as required, act as a damper and therefore, the external stress by vibrations can be prevented from acting more than necessary on the glass substrate 6, the semiconductor thin film element 7 formed on the glass substrate 6 and the scintillator 8. Further, the elastic members 5, 13 and 14 forming the substantially hermetically sealed spaces 11 and 16 can be provided with minute orifices 12 to thereby hold the radiation image detecting means 10 stably against any fluctuation of the atmospheric pressure.

As described above, the first elastic member is held by and between the glass substrate and the mounting member, and the second elastic member is provided in the substantially hermetically sealed spaces before and behind it, whereby shock resistance and vibration resistance can be maintained at a high level and the glass substrate can be held.

Also, the first elastic member is held by and between the glass substrate and the mounting member, and the second elastic member is provided in the substantially hermetically sealed spaces before and behind it, whereby shock resistance and vibration resistance can be maintained at a high level and the radiation image detecting means can be stably held against any change in the environmental temperature, and highly accurate radiation photographing can be accomplished.

What is claimed is:

1. A glass substrate holding apparatus for holding a glass substrate formed with a semiconductor thin film element, comprising:

a first elastic member disposed on a substantially outer peripheral portion of a surface opposite to that surface of the glass substrate on which the semiconductor thin film element is formed;

a mounting member disposed so as to hold said first elastic member between itself and the glass substrate;

a second elastic member disposed in a space surrounded by the glass substrate, said first elastic member and said mounting member, and interposed between the glass substrate and said mounting member; and a third elastic member peripherally disposed over the surface of the glass substrate on which the semiconductor thin film element is formed so as to support the glass substrate.

2. An apparatus according to claim 1, wherein the glass substrate formed with the semiconductor element forms a part of detecting means for detecting a radiation image transmitted through an object.

3. An apparatus according to claim 2, wherein a material of low radiation scattering property is used for at least one of said first elastic member and said second elastic member.

4. A glass substrate holding apparatus for holding a glass substrate formed with a semiconductor thin film element, comprising:
- a first elastic member disposed on a substantially outer peripheral portion of a surface opposite to that surface of the glass substrate on which the semiconductor thin film element is formed;
- a mounting member disposed so as to hold said first elastic member between itself and the glass substrate; and
- a second elastic member disposed in a space surrounded by the glass substrate, said first elastic member and said mounting member, and interposed between the glass substrate and said mounting member,
- wherein at least one minute orifice is formed in a portion of said first elastic member.

5. A glass substrate holding apparatus for holding a glass substrate formed with a semiconductor thin film element, comprising:
- a first elastic member disposed on a substantially outer peripheral portion of a surface opposite to that surface of the glass substrate on which the semiconductor thin film element is formed;
- a mounting member disposed so as to hold said first elastic member between itself and the glass substrate; and
- a second elastic member disposed in a space surrounded by the glass substrate, said first elastic member and said mounting member, and interposed between the glass substrate and said mounting member,
- wherein said first elastic member and said second elastic member have different mechanical characteristics.

6. A glass substrate holding apparatus for holding a glass substrate formed with a semiconductor thin film element, comprising:
- a first elastic member disposed on a substantially outer peripheral portion of a surface opposite to that surface of the glass substrate on which the semiconductor thin film element is formed;
- a mounting member disposed so as to hold said first elastic member between itself and the glass substrate;
- a second elastic member disposed in a space surrounded by the glass substrate, said first elastic member and said mounting member, and interposed between the glass substrate and said mounting member;
- a third elastic member peripherally disposed over the surface of the glass substrate on which the semiconductor thin film element is formed; and
- a front face member disposed so as to hold said third elastic member between itself and the glass substrate.

7. An apparatus for effecting photographing by the use of radiation, comprising:
- a radiation image detecting element including a glass substrate formed with a semiconductor thin film element; and
- a glass substrate holding structure for holding said glass substrate, said glass substrate holding structure including:
    - I) a first elastic member disposed on a substantially outer peripheral portion of a surface opposite to that surface of said glass substrate on which the semiconductor thin film element is formed;
    - II) a mounting member disposed so as to hold said first elastic member between itself and said glass substrate;
    - III) a second elastic member disposed in a space surrounded by said glass substrate, said first elastic member and said mounting member, and interposed between said glass substrate and said mounting member; and
    - IV) a third elastic member peripherally disposed over the surface of said glass substrate on which the semiconductor thin film element is formed so as to support said glass substrate.

8. An apparatus according to claim 7, wherein a material of low radiation scattering property is used for at least one of said first elastic member and said second elastic member.

9. An apparatus for effecting photographing by the use of radiation, comprising:
- a radiation image detecting element including a glass substrate formed with a semiconductor thin film element; and
- a glass substrate holding structure for holding said glass substrate, said glass substrate holding structure including:
    - I) a first elastic member disposed on a substantially outer peripheral portion of a surface opposite to that surface of said glass substrate on which the semiconductor thin film element is formed;
    - II) a mounting member disposed so as to hold said first elastic member between itself and said glass substrate; and
    - III) a second elastic member disposed in a space surrounded by said glass substrate, said first elastic member and said mounting member, and interposed between said glass substrate and said mounting member,
    - wherein at least one minute orifice is formed in a portion of said first elastic member.

10. An apparatus for effecting photographing by the use of radiation, comprising:
- a radiation image detecting element including a glass substrate formed with a semiconductor thin film element; and
- a glass substrate holding structure for holding said glass substrate, said glass substrate holding structure including:
    - I) a first elastic member disposed on a substantially outer peripheral portion of a surface opposite to that surface of said glass substrate on which the semiconductor thin film element is formed;
    - II) a mounting member disposed so as to hold said first elastic member between itself and said glass substrate; and
    - III) a second elastic member disposed in a space surrounded by said glass substrate, said first elastic member and said mounting member, and interposed between said glass substrate and said mounting member,
    - wherein said first elastic member and said second elastic member have different mechanical characteristics.

11. An apparatus for effecting photographing by the use of radiation, comprising:
- a radiation image detecting element including a glass substrate formed with a semiconductor thin film element;
- a glass substrate holding structure for holding said glass substrate, said glass substrate holding structure including:
  - I) a first elastic member disposed on a substantially outer peripheral portion of a surface opposite to that surface of said glass substrate on which the semiconductor thin film element is formed;
  - II) a mounting member disposed so as to hold said first elastic member between itself and said glass substrate;
  - III) a second elastic member disposed in a space surrounded by said glass substrate, said first elastic member and said mounting member, and interposed between said glass substrate and said mounting member;
  - IV) a third elastic member peripherally disposed over the surface of said glass substrate on which the semiconductor thin film element is formed; and
  - V) a front face member disposed so as to hold said third elastic member between itself and said glass substrate.

12. A glass substrate holding apparatus for holding a glass substrate formed with a semiconductor thin film element, comprising:
- a first elastic member disposed on a substantially outer peripheral portion of a surface opposite to that surface of the glass substrate on which the semiconductor thin film element is formed;
- a mounting member disposed so as to hold said first elastic member between itself and the glass substrate, and
- a second elastic member disposed in a space surrounded by the glass substrate, said first elastic member and said mounting member, and interposed between said glass substrate and said mounting member,
- wherein said first elastic member has a minute gap on a portion thereof.

13. An apparatus for effecting photographing by the use of radiation, comprising:
- a radiation image detecting element including a glass substrate formed with a semiconductor thin film element; and
- a glass substrate holding structure for holding said glass substrate, said glass substrate holding structure including:
  - I) a first elastic member disposed on a substantially outer peripheral portion of a surface opposite to that surface of said glass substrate on which the semiconductor thin film element is formed;
  - II) a mounting member disposed so as to hold said first elastic member between itself and said glass substrate; and
  - III) a second elastic member disposed in a space surrounded by said glass substrate, said first elastic member and said mounting member, and interposed between said glass substrate and said mounting member,
- wherein said first elastic member has a minute gap on a portion thereof.

* * * * *

UNITED STATES PATENT AND TRADEMARK OFFICE
CERTIFICATE OF CORRECTION

PATENT NO.   : 6,025,598
DATED        : February 15, 2000
INVENTOR(S)  : Akira Tago Page 1 of 1

It is certified that error appears in the above-identified patent and that said Letters Patent is hereby corrected as shown below:

Title page, item [54],
"PHOTOGRAPHIC" should read -- PHOTOGRAPHING --

Column 1,
Title, "PHOTOGRAPHIC" should read -- PHOTOGRAPHING --.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*